United States Patent
Hanahara et al.

(10) Patent No.: US 7,460,026 B2
(45) Date of Patent: Dec. 2, 2008

(54) REMOTE CONTROLLER

(75) Inventors: Tetsuro Hanahara, Tsuruga (JP); Noriaki Matsui, Tsuruga (JP)

(73) Assignee: Panasonic Corporation, Osaka (JP)

( * ) Notice: Subject to any disclaimer, the term of this patent is extended or adjusted under 35 U.S.C. 154(b) by 583 days.

(21) Appl. No.: 11/121,228

(22) Filed: May 3, 2005

(65) Prior Publication Data
US 2005/0253733 A1 Nov. 17, 2005

(30) Foreign Application Priority Data
May 13, 2004 (JP) ............................ 2004-143450
May 18, 2004 (JP) ............................ 2004-147427

(51) Int. Cl.
*G08B 5/22* (2006.01)
(52) U.S. Cl. ..................... 340/825.49; 340/825.69; 340/539.32; 340/571; 341/176
(58) Field of Classification Search ............. 340/825.49, 340/5.61–5.64, 426.16, 539.32, 825.69, 825.79; 341/176; 348/734; 398/106, 115
See application file for complete search history.

(56) References Cited

U.S. PATENT DOCUMENTS

| | | | | |
|---|---|---|---|---|
| 5,680,105 A | * | 10/1997 | Hedrick ...................... | 340/571 |
| 5,684,471 A | * | 11/1997 | Bernardi et al. ........ | 340/825.72 |
| 5,705,997 A | * | 1/1998 | Park ...................... | 340/825.49 |
| 6,271,832 B1 | * | 8/2001 | Kamaeguchi et al. ....... | 345/158 |
| 6,445,290 B1 | * | 9/2002 | Fingal et al. ........... | 340/539.32 |
| 6,879,254 B1 | * | 4/2005 | Graham ................. | 340/539.32 |

FOREIGN PATENT DOCUMENTS

| | | |
|---|---|---|
| JP | 63-314994 | 12/1988 |
| JP | 2000-022562 | 1/2000 |

\* cited by examiner

*Primary Examiner*—Edwin C Holloway, III
(74) *Attorney, Agent, or Firm*—RatnerPrestia

(57) ABSTRACT

A remote controller includes (i) an operating part having at least a key, (ii) a transmitter for transmitting a remote-control signal, (iii) a receiver for a receiving search signal, (iv) an informer for generating at least one of sound and vibration, and (v) a controller connected to these parts. The controller operates the transmitter according to an operation at the operating part, detects that the remote controller is in an abnormal operation state other than normal operation state according to an operation at the operating part, and operates the informer responsive to the search signal received by the receiver at least in the case of abnormal operation.

2 Claims, 4 Drawing Sheets

REMOTE CONTROLLER

BACKGROUND OF THE INVENTION

1. Field of the Invention

The present invention relates to a remote controller used for remote-controlling visual, audio, air-conditioning or other equipment mainly in an automobile.

2. Background Art

With recent progress of the function and diversity of automobiles, visual, audio, air-conditioning, or other equipment is being introduced into an automobile. The operating part of the equipment is provided on a front panel of the automobile. Additionally, a remote controller for remote-controlling such equipment from the back seat or the like far from the front panel is being introduced.

The remote controller used inside of an automobile in this manner is possibly left under a seat or hidden in the gap between a center console and a seat in some cases. A remote controller having an informer for informing the location of the remote controller by a predetermined operation is disclosed in Japanese Patent Unexamined Publication No. 2000-22562, for example, so that the remote controller can easily be found in such a case.

A conventional remote controller is described with reference to FIG. 4. FIG. 4 is a front view of a conventional remote controller. On the top face of substantially box-shaped housing 21 made of insulating resin, operating part 22 is provided. Operating part 22 has a plurality of keys each protruding vertically movable. The bottom face of each key has switch contacts (not shown). In housing 21, a circuit board (not shown) having a plurality of wiring patterns formed on the top and bottom faces thereof is housed. Electronic components, such as a microcomputer, mounted on the top and bottom faces of this circuit board form a controller (not shown). Electronic components, such as a light-emitting diode (LED), form transmitter 24.

Further, on this circuit board, an antenna, a buzzer, and the like are mounted to form a receiver and an informer (neither shown). Thus, a remote controller is structured.

Such a remote controller is placed inside of a vehicle. When a predetermined key on the remote controller is pressed from the back seat or the like far from the front panel, the switch contacts of the key are brought into electric contact and the controller detects the operation state. The predetermined key stands for key 22A for powering on/off equipment or key 22B for adjusting sound volume, for example. Then, an infrared remote-control signal corresponding to each of these keys is transmitted from transmitter 24 to the equipment. Thus, the audio or air-conditioning equipment is powered on/off or sound volume is adjusted by remote control.

However, when a remote controller is left under the seat or hidden in the gap between the center console and the seat, it is difficult to be found. In such a case, a user operates a predetermined switch (not shown) on the front panel or the like. Then, an antenna (not shown) provided near the room lamp, for example, transmits a radio wave including a search signal. When the receiver of the remote controller receives this search signal, the buzzer in the informer sounds and informs the user of the location of the remote controller. Thus, the user can easily find the remote controller.

Incidentally, when any key on the remote controller, e.g. key 22A, is pressed, in other words, when any passenger uses the remote controller, the controller stops the operation of the informer. That is, while it is considered that the remote controller is normally operated, even if other passenger inadvertently operates the search switch and the receiver receives the search signal, the informer does not operate.

As described above, for the conventional remote controller, even when a search signal is transmitted with any key pressed, the informer does not operate. For this reason, when a baggage is placed on the remote controller or the remote controller is sandwiched between the seats, i.e. some keys are pressed, the remote controller cannot be located and is difficult to be found.

SUMMARY OF THE INVENTION

A remote controller of the present invention includes (i) an operating part having at least a key, (ii) a transmitter for transmitting a remote-control signal, (iii) a receiver for receiving a search signal, (iv) an informer for generating at least one of sound and vibration, and (v) a controller connected to these parts. The controller operates the transmitter according to an operation at the operating part, detects that the remote controller is in an abnormal operation state other than normal operation state according to an operation at the operating part, and operates the informer responsive to the search signal received by the receiver at least in the case of the abnormal operation. With this structure, when only one key is pressed and the remote controller is normally operated, the informer does not operate. On the other hand, in abnormal operation other than normal operation, i.e. when a baggage is placed on the remote controller or the remote controller is sandwiched between the seats, the informer operates. Thus, a remote controller easily located and searched can be obtained.

DETAILED DESCRIPTION OF THE INVENTION

Figure 1:
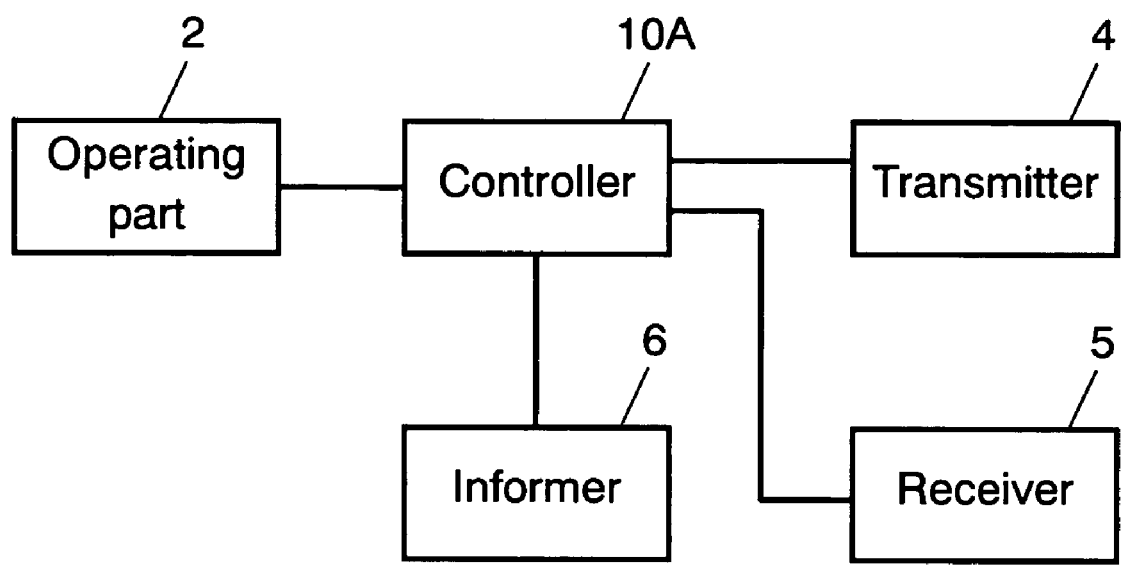
FIG. 1 is a block diagram of a remote controller in accordance with an exemplary embodiment of the present invention.
Figure 2:
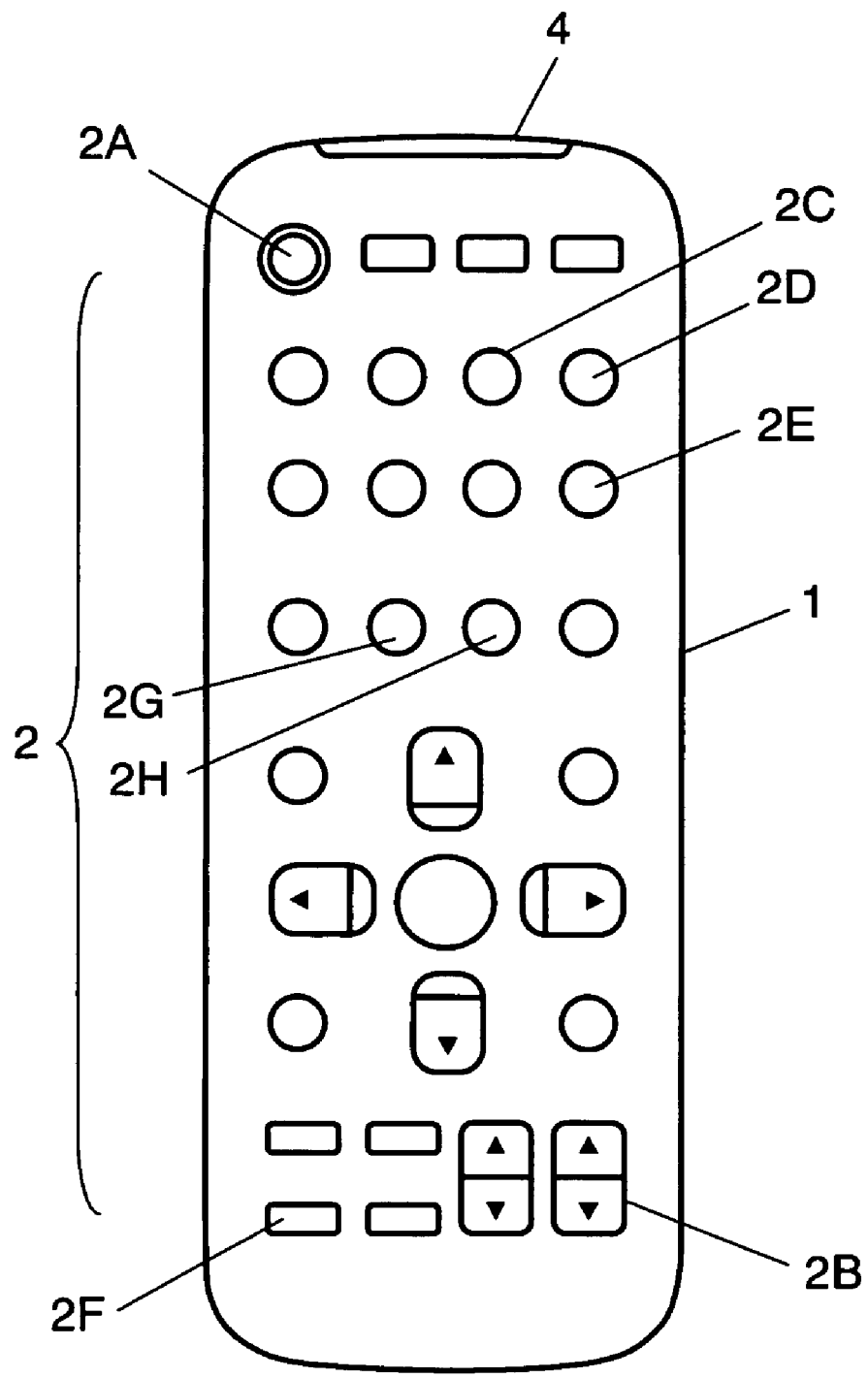
FIG. 2 is a front view of the remote controller shown in FIG. 1

FIG. 1 is a block diagram of a remote controller in accordance with an exemplary embodiment of the present invention. FIG. 2 is a front view thereof. On the top face of substantially box-shaped housing 1 made of insulating resin, such as polystyrene or acrylonitrile-butadiene-styrene (ABS) resin, operating part 2 is provided. Operating part 2 has a plurality of keys made of rubber or insulating resin, each protruding vertically movable. The bottom face of each key has switch contacts (not shown).

In housing 1, a circuit board (not shown) and having a plurality of wiring patterns formed of cupper foil or the like on the top and bottom faces thereof is housed. The circuit board is made of paper phenolic copper clad laminates or epoxy including glass. Electronic components, such as a microcomputer, mounted on the top and bottom faces of this circuit board form controller 10A. This circuit board further has transmitter 4, receiver 5, and informer 6. Transmitter 4 includes electronic components, such as an LED, and transmits remote-control signals. Receiver 5 includes an antenna, and receives search signals described later. Informer 6 includes a buzzer, a motor, or the like, and generates at least one of sound and vibration. In other words, controller 10A is connected to operating part 2, transmitter 4, receiver 5, and informer 6. Controller 10A operates transmitter 4 according to an operation at operating part 10A, and operates informer 6 according to an operation at operating part 2 and a search signal received by receiver 5. Thus, the remote controller is structured.

Such a remote controller is placed in a vehicle. When a predetermined key on the remote controller is pressed from the back seat or the like far from the front panel, the switch contacts of this key are brought into electric contact and controller 10A detects the operation state. The predetermined key stands for key 2A for powering on/off equipment or key 2B for adjusting sound volume, for example. Then, an infrared remote-control signal corresponding to each of these keys is transmitted from transmitter 4 to the equipment. Thus, the audio or air-conditioning equipment is powered on/off or sound volume is adjusted by remote control.

When a remote controller is left under a seat or hidden in the gap between a center console and a seat, it is difficult to be found. In such a case, a user operates a predetermined switch (not shown) on the front panel or the like. Then, an antenna (not shown) provided near the room lamp, for example, transmits a radio wave of a search signal. When receiver 5 of the remote controller receives this search signal, controller 10A causes the buzzer, the motor, or the like in the informer to generate sound, vibration, or the like and informs the user of the location of the remote controller. Thus, the user can easily find the remote controller.

Incidentally, while any key on the remote controller, e.g. key 2A, is pressed, controller 10A detects the operation state at operating part 2 and keeps the operation of informer 6 in the stop state. This means any passenger uses the remote controller. In other words, while it is considered that only one key is pressed to normally operate a remote controller, even if other passenger inadvertently operates the search switch and receiver 5 receives a search signal, informer 6 does not operate.

On the other hand, when a plurality of keys 2C and 2D, for example, is pressed at the same time, e.g. when a baggage is placed on the remote controller, or the remote controller is sandwiched between the seats, controller 10A detects these operation states. In such states, the remote controller is not normally operated. Then, when receiver 5 receives a search signal, controller 10A causes the buzzer, the motor, or the like in informer 6 to generate sound, vibration, or the like.

As described above, controller 10A detects that detects that the remote controller is in an abnormal operation state other than normal operation state according to an operation at operating part 2. In the case of abnormal operation, controller 10A operates informer 6 responsive to a search signal received by receiver 5. Also, when operating part 2 is not in operation, controller 10A operates informer 6 responsive to the search signal received by receiver 5. In the case of normal operation, controller 10A does not operate informer 6.

In other words, when only one key is pressed in a normal remote operation, informer 6 is stopped. On the other hand, a radio wave search signal is transmitted from a vehicle with a plurality of keys pressed at the same time, e.g. when a baggage is placed on a remote controller or the remote controller is sandwiched between seats, the remote controller operates informer 6 so that the location thereof is informed and searched. Now, a plurality of keys pressed at the same time by a baggage, a seat, or the like is generally adjacent to each other. For this reason, it is preferable that informer 6 operates when a plurality of adjacent keys, e.g. 2C and 2D, are pressed at the same time.

In a state when a plurality of keys, e.g. 2C and 2D, are pressed and informer 6 is operated, even if a key adjacent to these keys, e.g. 2E, is pressed, informer 6 is still operated. On the other hand, when a key far from the plurality of keys, e.g. 2F, is pressed, controller 10A stops informer 6. It is preferable to structure the remote controller in this manner.

When the baggage placed on the remote controller slightly moves, or the remote controller is sandwiched deeply between the seats, a key, e.g. 2E, adjacent to the keys that have been pressed, e.g. 2C and 2D, is pressed. In such a case, for the above structure, informer 6 is still operated to inform the location of the remote controller. On the other hand, when a key, e.g. 2F, far from the plurality of keys is operated, i.e. when the baggage is removed or the remote controller is drawn from the seats, informer 6 is stopped and the remote controller is restored for normal remote operation. For example, while keys near one corner of housing 1, e.g. 2C and 2D, are operated, a key opposite to keys 2C and 2D along the diagonal line of the face of housing 1 on which operating part 2 is provided, e.g. 2F, or a key opposite to keys 2C and 2D along the longitudinal direction of housing 1, e.g. 2B, is operated. In such cases, it is preferable to structure the remote controller to stop informer 6. Similarly, while keys near the center of the face of housing 1 on which operating part 2 is provided, e.g. 2G and 2H, are operated, a key near one corner of housing 1, e.g. 2A or 2B, is operated. In such cases, it is preferable to structure the remote controller to stop informer 6.

As described above, for a remote controller of this structure, controller 10A detects the operation state of operating part 2. Then, when receiver 5 receives a search signal with at least two keys in operating part 2 operated at the same time, informer 6 is operated. This mechanism can provide a remote controller easily located and searched even when a baggage is placed on the remote controller or the remote controller is sandwiched between the seats.

In a state when a plurality of keys are operated and informer 6 is operated, when a key far from these keys are operated, controller 10A stops informer 6. Thus, the remote controller can be restored for normal operation after the remote controller is found with its keys pressed by the baggage or the seats.

Figure 3:
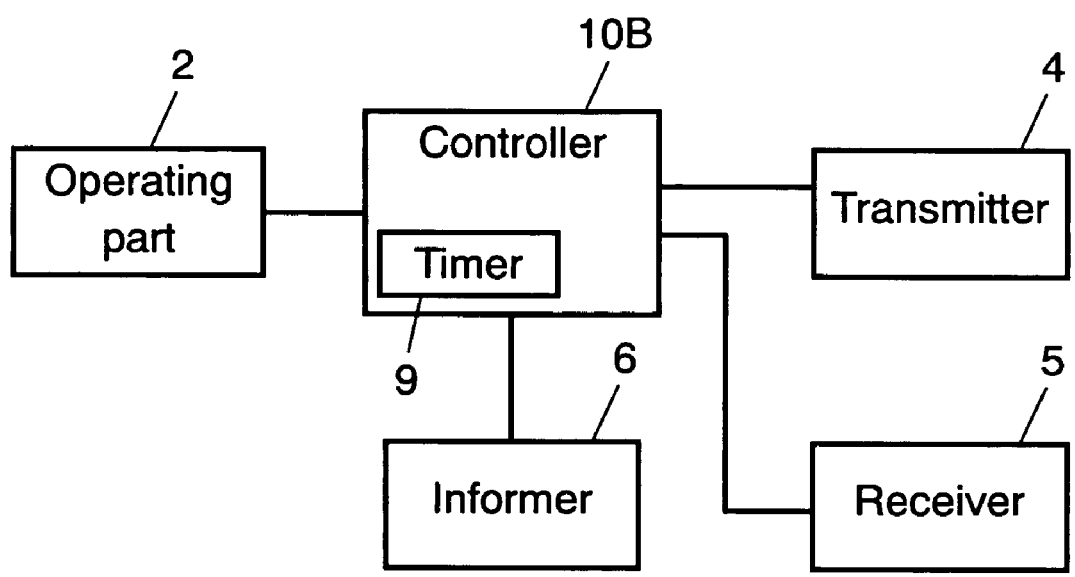
FIG. 3 is a block diagram of another remote controller in accordance with the exemplary embodiment of the present invention.
Figure 4:
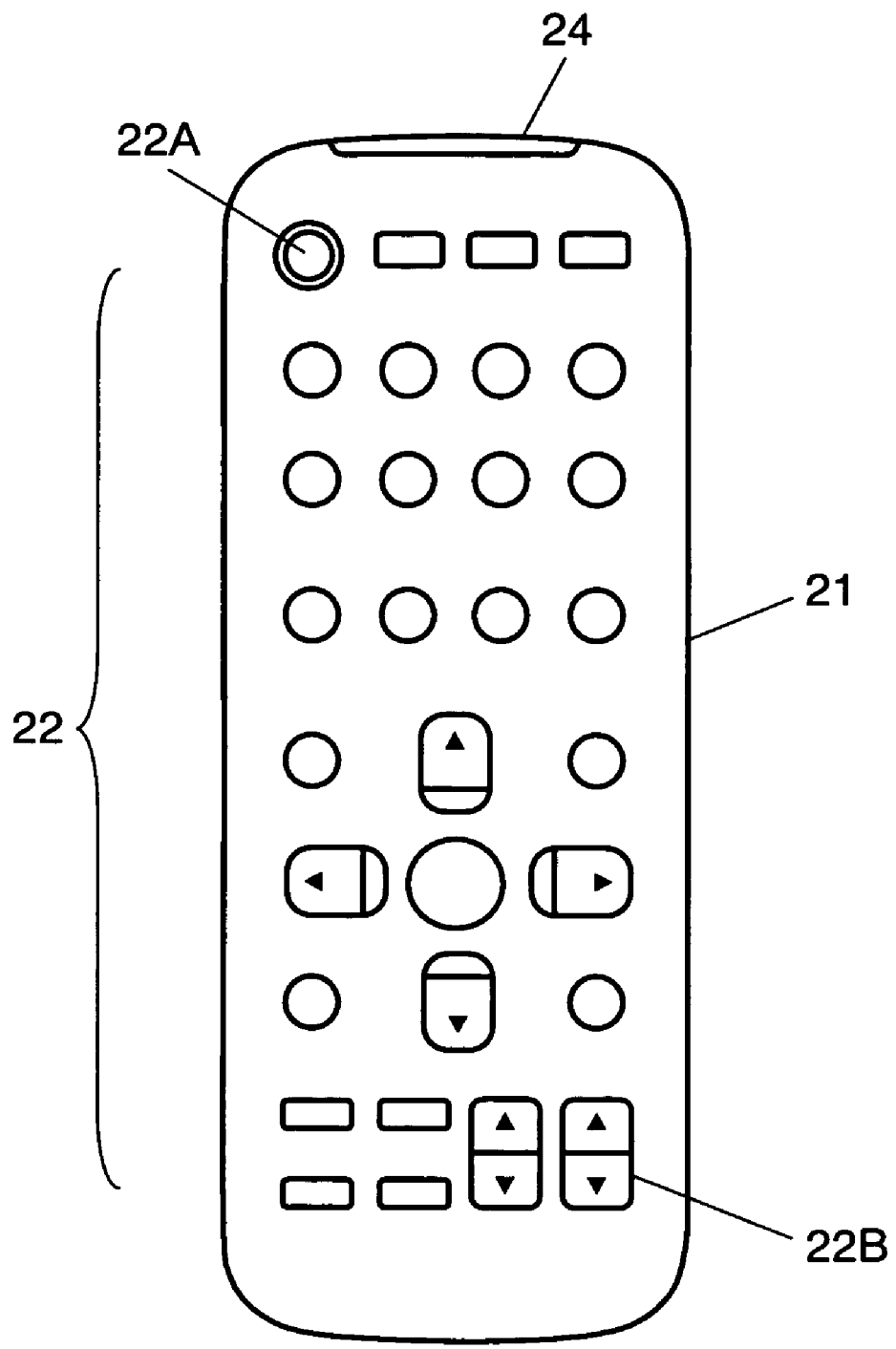
FIG. 4 is a front view of a conventional remote controller.

Next, a remote controller having another structure in accordance with this embodiment is described hereinafter. FIG. 3 is a block diagram of another remote controller in accordance with the exemplary embodiment of the present invention. The appearance of this remote controller is the same as that of FIG. 2. This remote controller is different from that of FIG. 1 in that it is provided with controller 10B having timer 9 for generating clock signals at predetermined intervals by a quarts oscillator or the like. The other structure is the same as that of FIG. 1 and the description thereof is omitted.

In the structure described above, normal remote operation of pressing only one key is the same as that of the structure of FIG. 1. Also, the operation in which a user operates a predetermined switch to transmit a radio wave search signal from an antenna so that informer 6 informs the location of the remote controller when keys in operating part 2 are not pressed is the same as that of FIG. 1.

Further, when any key on the remote controller is pressed, controller 10B detects the operation state of operating part 2 and does not operate informer 6. This mechanism is also the same as that of FIG. 1. At this time, controller 10B counts the operation time of a key in operating part 2, using timer 9 in this structure. When the period of time for which the operation continues is within a predetermined period of time, and the operation is completed within a predetermined period of time, controller 10B makes informer 6 ready for operation.

For example, when key 2B is pressed for five seconds and then the operation is completed, controller 10B does not operate informer 6. Next, when key 2A is pressed, controller 10B starts counting the operation time of key 2A, using timer 9. When the operation of key 2A continues for more than the predetermined period of time, e.g. approximately 10 minutes, and receiver 5 receives a search signal for locating the remote controller, controller 10B operates the buzzer, the motor, or the like in informer 6. In other words, controller 10B detects that the remote controller is in an abnormal operation state other than normal operation state according to an operation at operating part 2, and operates informer 6 responsive to the search signal received by receiver 5 at least in the case of abnormal operation.

That is, while a key is pressed for a predetermined period of time to normally operate the remote controller, even if other passenger inadvertently operates a search switch and receiver 5 receives a search signal, controller 10B does not operate informer 6. On the other hand, when one key continues to be pressed for ten and several minutes, longer than the period of time of normal operation, controller 10B operates informer 6.

When a baggage is place on the remote controller or the remote controller is sandwiched between seats, key 2A or 2B continues to be pressed for the predetermined period of time, which is different from the normal remote operation of the key. When controller 10B detects these operation states and receiver 5 receives a search signal under these conditions, the buzzer, the motor, or the like in informer 6 generates sound, vibration, or the like. In this manner, the remote controller informs its user of its location and the user can find the remote controller.

Incidentally, while key 2D, for example, continues to be pressed, even if a key adjacent to key 2D, e.g. 2C or 2E, is pressed, informer 6 is still operated. On the other hand, if a key far from key 2D, e.g. 2B or 2F, is pressed, controller 10B stops informer 6. The description of this mechanism in this structure is the same as that of FIG. 1. In other words, when a key near one corner of housing 1, e.g. 2D, continues operation for at least a predetermined period of time, a key opposite to key 2D along the diagonal line of the face of housing 1 on which operating part 2 is provided, e.g. 2F, or a key opposite to key 2D along the longitudinal direction of housing 1, e.g. 2B, is operated. In such cases, it is preferable to structure the remote controller to stop informer 6. Similarly, when a key near the center of the face of housing 1 on which operating part 2 is provided, e.g. 2G, continues operation for at least a predetermined period of time, a key near one corner of housing 1, e.g. 2A, 2B, 2C, or 2F is operated. In such cases, it is preferable to structure the remote controller to stop informer 6.

As described above, for a remote controller of this structure, controller 10B detects the operation state of operating part 2. When receiver 5 receives a search signal with any key in operating part 2 continuing operation for at least a predetermined period of time, informer 6 is operated. This mechanism can provide a remote controller easily located and searched even when a baggage is placed on the remote controller or the remote controller is sandwiched between seats.

Incidentally, in this structure, timer 9 is provided in controller 10B. However, the timer can be structured separately.

As described above, the remote controller of the present invention can easily be located and searched and is useful for remote-controlling visual, audio, air-conditioning and other equipment mainly in an automobile.

What is claimed is:

1. A remote controller comprising:
an operating part having a plurality of keys;
a transmitter for transmitting a remote-control signal;
a receiver for receiving a search signal;
an informer for generating at least one of sound and vibration; and
a controller coupled to the operating part, the transmitter, the receiver, and the informer, and for operating the transmitter according to an operation of the operating part,
wherein the controller permits operation of the informer when (1) the receiver receives the search signal and (2) the controller detects at least two of the plurality of keys depressed at the same time, and
wherein when a key non-adjacent from any of the at least two depressed keys of the plurality of keys is depressed in a state when the controller is operating the informer, the controller stops the informer.

2. A remote controller comprising:
an operating part comprising a key;
a transmitter for transmitting a remote-control signal;
a receiver for receiving a search signal;
an informer for generating at least one of sound and vibration; and
a controller coupled to the operating part, the transmitter, the receiver, and the informer, and for operating the transmitter according to an operation of the operating part, the controller including a timer for counting a period of time for which the key continues to be depressed,
wherein the controller permits operation of the informer when (1) the controller detects that the key continues to be depressed for a predetermined period of time, using the timer, and (2) the receiver receives a search signal, and wherein;
the operating part further comprises a plurality of keys,
the depressed key is one of the plurality of keys, and
when a further key of the plurality of keys now-adjacent from the depressed key is depressed in a state when the controller is operating the informer, the controller stops the informer.

* * * * *

UNITED STATES PATENT AND TRADEMARK OFFICE
CERTIFICATE OF CORRECTION

PATENT NO. : 7,460,026 B2 Page 1 of 1
APPLICATION NO. : 11/121228
DATED : December 2, 2008
INVENTOR(S) : Hanahara et al.

It is certified that error appears in the above-identified patent and that said Letters Patent is hereby corrected as shown below:

At Column 6, line 49, "now-adjacent" should read --non-adjacent--

Signed and Sealed this

Tenth Day of March, 2009

JOHN DOLL
*Acting Director of the United States Patent and Trademark Office*